Feb. 6, 1940.  H. A. REECE  2,188,920
CONTROL APPARATUS FOR OPERATING FURNACES
Filed June 25, 1938  3 Sheets-Sheet 1
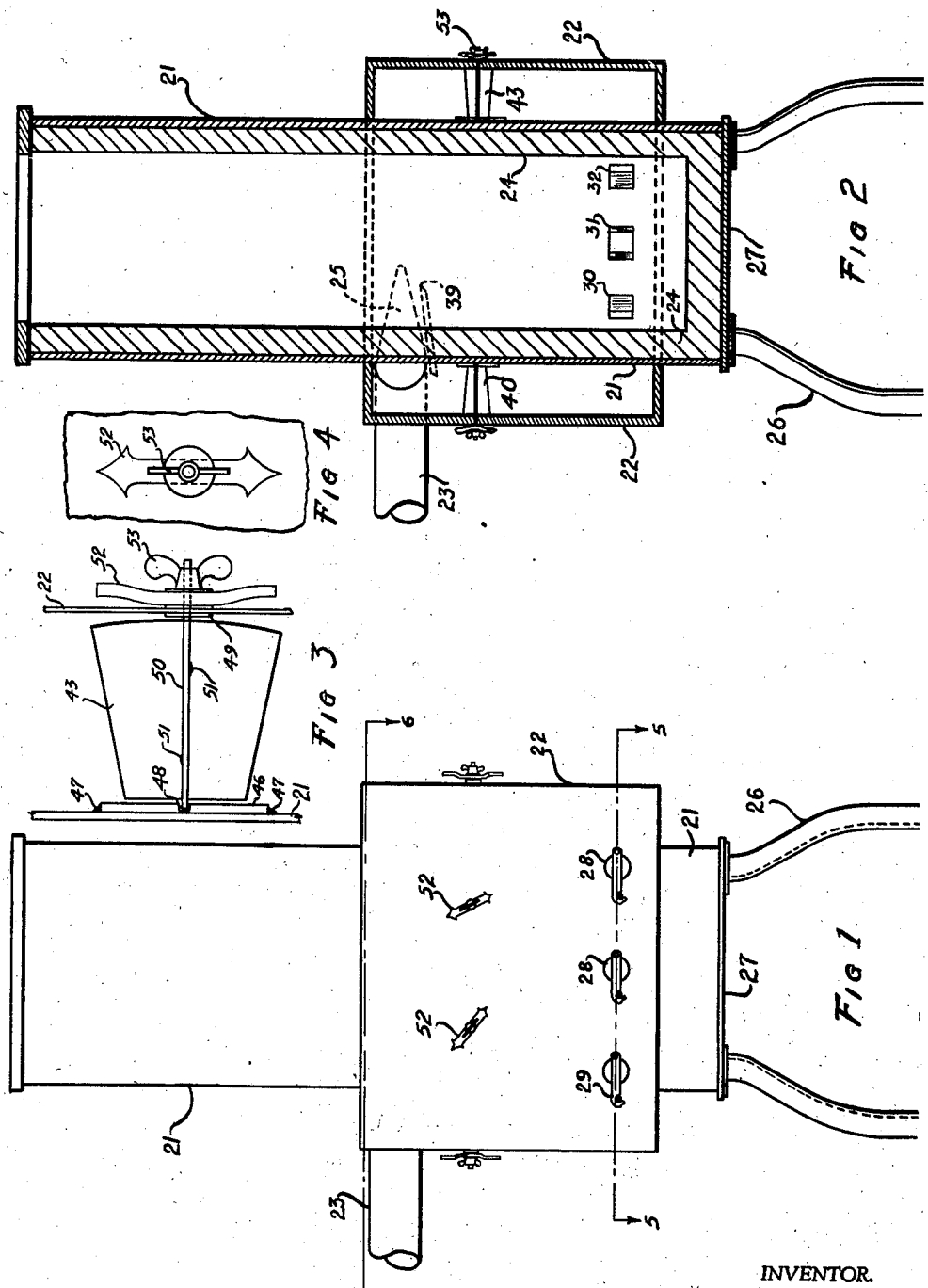
INVENTOR.
Herbert A Reece
BY
ATTORNEY.

Feb. 6, 1940.  H. A. REECE  2,188,920
CONTROL APPARATUS FOR OPERATING FURNACES
Filed June 25, 1938  3 Sheets-Sheet 2
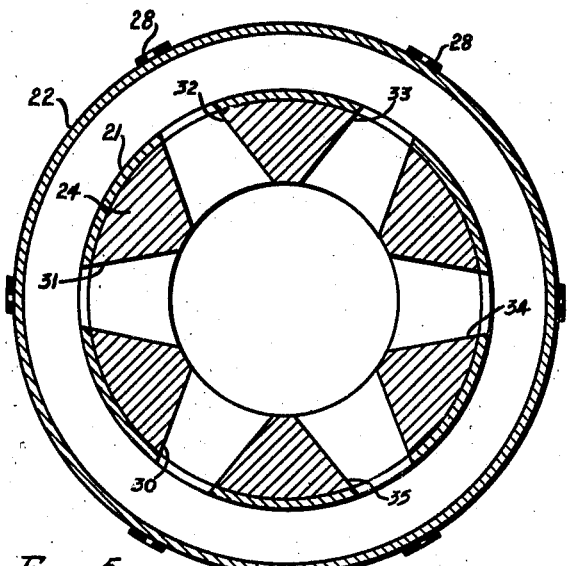
Fig 5
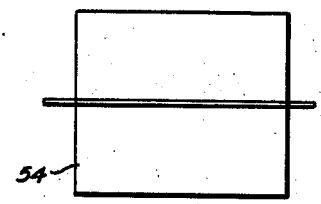
Fig 7
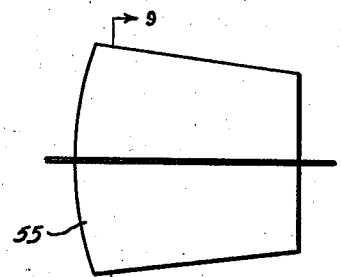
Fig 8
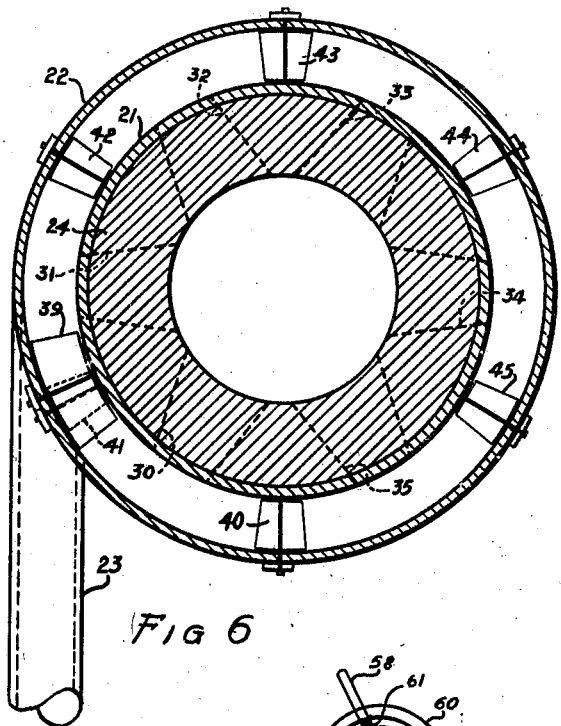
Fig 6
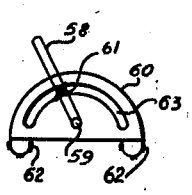
Fig 12
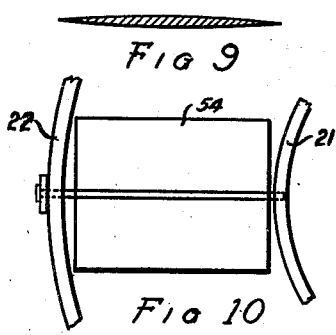
Fig 9
Fig 10
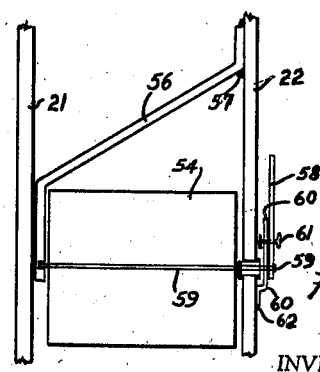
Fig 11
INVENTOR.
Herbert A. Reece
BY Woodling and Krost
ATTORNEY.

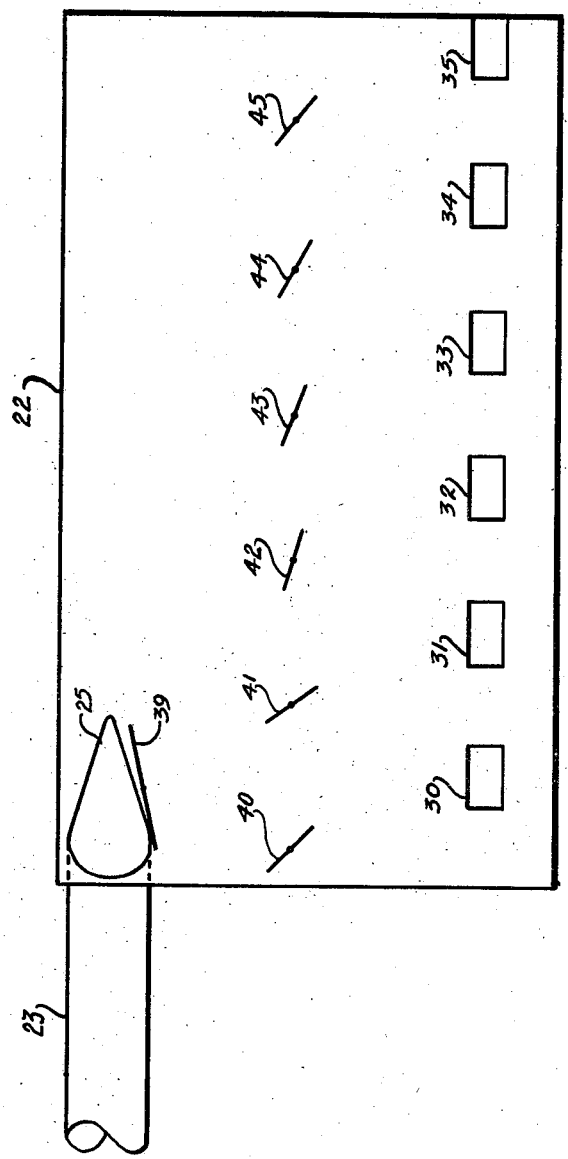

Patented Feb. 6, 1940

2,188,920

UNITED STATES PATENT OFFICE 2,188,920

CONTROL APPARATUS FOR OPERATING FURNACES

Herbert A. Reece, Cleveland Heights, Ohio, assignor to Meehanite Metal Corporation, a corporation of Tennessee Application June 25, 1938, Serial No. 215,791

6 Claims. (Cl. 266—30)

My invention relates to metallurgical furnaces, and more particularly to wind boxes for furnaces such as cupolas and the like, and to the method of operating the same.

In the following discussion the operation and structure of a cupola for the remelting of metal will be referred to, but it is to be understood that my invention includes the structure and operation of all furnaces wherein a blast of air or other gases is supplied through a plurality of tuyères to the interior of the furnace.

In the operation of metallurgical furnaces such as cupolas it is necessary to supply a blast of air to the interior of the furnace for supplying air to the furnace contents being processed to promote combustion.

The shaft of the cupola to be operated is charged with one or more charges of coke and of the metal to be melted directly upon the coke bed. The coke upon being ignited is in an incandescent state and upon the oxygen of the air blown into the furnace uniting with the coke carbon, oxides of the carbon are formed. The location where this union takes place and where the greatest heat is liberated is referred to as the melting zone as it is here that the heat is sufficient to melt the metal which thereupon falls to the bottom of the cupola in a molten state. The blast of air is supplied to the interior of the cupola through a number of tuyères or conduits extending through the wall of the body of the cupola.

The tuyères are usually arranged substantially in one horizontal plane and around the periphery of the body of the cupola. In other possible arrangements, the tuyères may be located in more than one layer, that is, there may be one set of tuyères in one horizontal plane and another set of tuyères in another horizontal plane, or the tuyères may be otherwise arranged. For the purpose of simplification and clarity, my invention will be discussed in the embodiment in which one set of tuyères arranged in substantially one horizontal plane is utilized. It is to be understood, however, that my invention is likewise applicable to other arrangements of the tuyères and the scope of my invention includes the modifications and changes which may be made for adaptation to all of said other arrangements.

The melting zone in a properly operated cupola is located within the shaft at a level above the tuyères through which the air blast enters. For obtaining a proper melt of metal having the essential qualities, it is desirable that all of the melting be done uniformly and at the proper location in the shaft. This desired control of the melting operation is a most sought for objective in the art and the difficulty of obtaining it has been a major problem in the operation of furnaces utilizing a blast of air.

To obtain a proper melt so as to produce molten metal having uniform quality, the control of the melting zone is highly essential. The melting zone should be within a stratum or section of the charge in the cupola substantially parallel to the plane of the set of tuyères and combustion should be substantially uniform throughout that stratum. In other words, the oxygen of the air blast from the several tuyères should unite with the carbon of the coke at substantially the same level above the air supplying tuyères.

The placing and distribution of tuyères of proper size around the periphery of the body of the cupola is important in the control of this melting zone but this precaution alone has not been found sufficient as variations in velocity of the air entering each of the several tuyères greatly influences the type of melting zone obtained. While the equalizing of the size of the tuyères and the uniform positioning of the tuyères have been factors in the control of the melting zone, the control of the velocities of the air entering each of the tuyères is the major influencing factor, in obtaining a proper melting operation.

It is known that castings are sometimes defective in foundry work due to gaseous extrusions as the metals cool down, technically called "differential oxidation". Lack of uniformity in shrinkage upon cooling has been a source of much conjecture as to the causes. The difference in velocities from one tuyère to another is an explanation of the lack of uniformity in the molten metal from the same furnace. Oxidation of the coke carbon takes place where the air supply and carbon form a union above the tuyères but the exact height above the tuyères in relation to the velocities of the air may not be definitely known. It is, however, known that the height of this union, that is, the height of the melting zone, bears a relationship to the air velocities.

A difference in velocities of air from the respective tuyères tends to cause "step melting", that is, melting at different heights. In such a condition of step melting the gases in the melting zone at one height do not fuse or cause a complete melt. The well melted metal tends to absorb the free gases not united. The absorbing of some gases at one level and the absorbing of other gases at another level prevents a complete unison of these gases, thereby resulting in the production of molten metal containing undesirable gases which are not retained at temperatures approaching solidification.

In order to approach uniformity in volume and velocity, as closely as possible in the supply of the air blast to the several tuyères positioned around the periphery of the body of the furnace, it has been the practice to supply the tuyères from a common source. This is done by positioning an air chamber adjacent to the body of the furnace so that all of the tuyères communicate with, and are supplied by, this common chamber. The air chamber in turn is supplied with a blast of air through an inlet conduit from a suitable air blower. This common air chamber is called by various names in the art, such as, wind box, wind belt, bustle, and air box, and will be referred to herein as a wind box. It assumes various forms and may have an arcuate or rectangular cross-section. Generally, it surrounds the body of the furnace at a low level where communication with the tuyères may be established directly or through relatively short intercommunicating conduits leading to each tuyère.

As has been stated, uniformity of velocities of the air blast entering each tuyère is a desired objective. It has been thought that this could be accomplished by partly shutting off one or more of the tuyères or the inter-communicating conduits leading to each tuyère from the wind-box. However, in practice this has not worked out successfully as the partial shut-off limits the volume of air admitted and causes lack of uniformity of the volume of air supplied to the several tuyères. A partial restriction placed at a tuyère or at the short inter-communicating conduit leading to the tuyère also tends to deflect back a portion of the air blast so as to cause a back pressure and to thus further throttle the flow of the air blast. It has therefore been necessary to obtain this uniformity of velocities by other means.

Prior to this invention numerous attempts have been made to regulate volumes and velocities of air through slide valves or the like at each tuyère or in the conduit to each tuyère. Such attempts have been unsuccessful in that in dampening off a main current of air or other gas, air pockets are formed and currents of air are deflected back into the path of travel of the air due to compressing the air at the point of restriction by the slide valve. This creation of air pockets and deflected air currents so interferes with the flow of air supplied to the tuyère to which such control is attempted that the volume of air supplied to that tuyère is diminished and results in the relative volume at all the tuyères being disturbed. The decrease in the volume of air admitted to one tuyère tends to increase the volume of air supplied to other tuyères. This throwing out of balance of the ratio of the air volumes to the tuyères is referred to as a disturbance of the volume.

It is an object of my invention to provide a wind box for supplying an air blast at substantially equal velocities to each of a plurality of tuyères.

A still further object is to provide a wind box for supplying an air blast to each of several tuyères at desired velocities without disturbing the relative volume of air supplied to each of the several tuyères.

Another object is to provide an apparatus for controlling velocity without a disturbance of volume.

It is a further object of my invention to provide a wind box for supplying an air blast to each of a plurality of tuyères in a manner that the velocity of the air blast to one tuyère is relatively proportioned to the velocity of the air blast to another tuyère.

Another object is to provide a device for modifying the velocity of a portion of the air blast passing through a wind box.

Another object is to provide a device for distributing the currents of the air blast passing through a wind box so as to affect the relative velocities of the air blast supplied to each of several tuyères.

Another object is to provide a device for controlling the velocity of air to the tuyères while the furnace is in operation.

Another object is to provide a device for adjusting the relative velocities of air supplied to several tuyères and at the same time maintaining the relative volumes of air supplied to the several tuyères.

Another object is to provide a device for deflecting a portion of air supplied to a tuyère at a distance from the entrance to the tuyère to avoid compression or change of pressure.

Another object is to provide a device for improving the operation of furnaces utilizing an air blast.

Another object is to provide a device for adjustably determining the velocity of the air blast to one or more of several tuyères.

Another object is to provide a device for supplying an air blast to a furnace to control the melting zone in the furnace.

Another object is to provide a method for improved operation of furnaces.

A further object is to provide an improved method of supplying an air blast to a plurality of tuyères of a furnace.

And a still further object is the provision of apparatus and method for production of molten metal of an improved and uniform quality.

Other objects and a fuller understanding may be had by referring to the following description and claims, taken in conjunction with the accompanying drawings, in which:

Figure 1 is an elevational view of a cupola and wind box mounted thereon;

Figure 2 is a cross-sectional view taken lengthwise of the cupola and wind box shown in Figure 1;

Figure 3 is a detailed view of one of the deflecting vanes and shows the mounting of the vane in the wind box;

Figure 4 is a view looking at the right hand end of the illustration of Figure 3 and from the outside of the wind box;

Figure 5 is a cross-sectional view of the cupola taken through the line 5—5 of Figure 1;

Figure 6 is a sectional view taken through the line 6—6 of Figure 1;

Figure 7 illustrates one form of deflecting vane;

Figure 8 illustrates another form of deflecting vane;

Figure 9 illustrates a modified form of vane and is a cross-sectional view taken through the line 9—9 of Figure 8;

Figure 10 illustrates a modified form of mounting the deflecting vane in the wind box;

Figure 11 illustrates another modified manner of mounting the deflecting vane in the wind box and another form of indicating means;

Figure 12 is a view looking at the right hand end of the illustration of Figure 11 and from the outside of the windbox; and Figure 13 is a diagrammatical view of a wind box embodying features of my invention and illustrates the wind box opened up and lying in the flat so as to demonstrate one arrangement of the relative positioning of the parts and their cooperation.

The cupola shown in Figure 1 has a cupola body 21 which sets upon the support 26. The cupola body or shell 21 is in the form of a cylindrical shaft, the inner walls of the cupola body 21 being lined by the fire brick lining 24. The body 21 and the lining 24 are mounted upon the bottom plate 27.

For purposes of simplicity in illustration, the usual tap hole and slag hole are not shown. It has also been considered unnecessary to illustrate such other openings as a clean-out door, breast arch, or drop bottom doors. The cupola illustrated, however, may be considered as having all of the parts necessary for the usual operation of the same.

The wind box 22 of cylindrical shape is mounted upon the cupola body 21 by welding or other suitable means and in the embodiment shown, the outer wall of the cupola body forms one of the enclosing walls of the wind box 22. It is therefore seen from the views of Figures 1 and 2 that the wind box 22 forms an enclosed jacket surrounding the cupola body 21 in such a way that air introduced into the wind box may circulate entirely around the cupola body.

The inlet conduit 23 is in communication with the air blower or other source of an air blast and the inlet conduit 23 is connected to the wind box 22 at the upper portion of the wind box 22 so as to afford communication between the air blower and the inlet opening 25 of the wind box 22.

In the cupola illustrated there are six tuyères extending through the wall and lining of the cupola body 21 so as to establish communication between the interior of the shaft of the cupola and the wind box 22. Tuyères 30, 31, and 32 are illustrated in Figure 2. All six tuyères, 30, 31, 32, 33, 34 and 35 are illustrated in Figures 5, 6 and 13. These tuyères are of substantially equal size and are uniformly spaced around the periphery of the cupola. It is to be noted that the tuyères enter the cupola body at a low level in the cupola and communicate with the wind box in a lower portion thereof. In order that the operator may look into the tuyères from the outside of the furnace, peep holes are provided in the wind box opposite each of the tuyères and mica or other suitable substance is sealed over these peep holes. Except when necessary, peep hole covers 28 hingedly connected to the wind box 22 are kept in position over the peep holes by means of the latch members 29.

A plurality of vanes or plates are mounted within the wind box 22 at a level above the tuyères. These vanes may be in the form of sheets of metal or other proper material. A simple form of vane is shown in Figure 7 in which the vane 54 is rectangular in shape and has a flat rectangular cross-section. The vane 55 in Figure 8 is somewhat modified in shape. One edge of the vane 55 is arcuate, so as to approximately complement the arcuate shape of the outer wall of the wind box 22. The cross-sectional of the vane 55 may be flat rectangular or it may be streamlined as is shown in Figure 9. Such a cross-section as shown in Figure 9 is somewhat more efficient in accurately meeting air current at the right angle and deflecting the current in the proper angle.

A set of six vanes are positioned in the wind box below the inlet opening 25 and above the tuyères. Only the vanes 40 and 43 of this set of six vanes is shown in Figure 2. All of the six vanes 40, 41, 42, 43, 44, and 45 are illustrated in Figure 6 and in Figure 13. It is seen from the several drawings that each vane is positioned approximately mid-way between lines drawn vertically through the center of the tuyères. By this arrangement, the tuyères and vanes are somewhat staggered so that each vane is not positioned directly above the center of a tuyère.

A seventh vane 39 is positioned somewhat above the set of six vanes and is mounted in the wind box 22 immediately adjacent to the lower portion of the inlet opening 25, so that the air blast entering the inlet conduit 23 may meet the vane 39 in the first instance. As the mounting for each of the vanes is substantially the same, the mounting of vane 43 is shown in Figures 3 and 4 as illustrative. An abutting plate 46 is welded by the welding 47 to the cupola body 21. A hole or socket 48 is formed in the plate 46 to act as a bearing. The vane 43 having the outline of the vane 55 shown in Figure 8 is mounted to the rod 50 by means of the weldings 51 so that the vane 43 revolves upon the turning of the rod 50. The inner end of the rod 50 rides freely within the socket 48 so as to turn therein. The other end of the rod 50 extends through a hole provided in the wall of the wind box 22 so as to protrude therefrom. An abutting washer 49 is secured or otherwise anchored to the rod 50 so as to prevent the rod 50 from moving outwardly of the wind box, that is, toward the right in Figure 3. Immediately outside of the wind box 22 the rod 50 is non-circular in cross-section and the indicator bar 52 having a non-circular opening is mounted thereon so that the indicator bar 52 will rotate with the rod 50 and thus indicate the position in which it is rotated. The outer end of the rod 50 is threaded and the wing nut 53 is threadably mounted thereon.

It is therefore seen from the views of Figures 3 and 4 that the vane 43 may be turned into any desired position by manually swinging the indicator bar 52. In this way the rod 50 acts as an axis upon which the vane 43 revolves. After the vane 43 is in the proper rotative position as is indicated by the position of the indicator bar 52, the wing nut 53 is tightened down so as to draw the abutting washer 49 and the bar 52 towards each other and thus locking the vane 43 to the wall of the wind box 22 in the desired position.

Figures 5 and 6 being cross-sectional views through the cupola and wind box illustrates the relative positions of the several parts. Figure 5 is a cross-sectional view taken through the cupola and wind box and in the direction of the arrows 5—5 of Figure 1 and shows the shape and positioning of the tuyères 30, 31, 32, 33, 34, and 35, extending through the wall and lining of the cupola body 21. The peep hole covers 28 in the outside wall of the wind box 22 are opposite each tuyère.

Figure 6 is a cross-sectional view taken through the cupola and wind box in the direction of the arrows 6—6 of Figure 1 and shows the set of six vanes, 40, 41, 42, 43, 44, and 45. The vane 39 is also shown and its relative position in respect to the other vanes and the inlet conduit 23 is illustrated. Vane 41 being below the vane 39 is shown in dotted lines. The six vanes, 40, 41, 42, 43, 44, and 45, are shown as distributed around the wind box and positioned approximately between the dotted lines indicating the six tuyères below. The vane 39 is at a higher level than the said set of six vanes, and is adjacent to the lower edge of the opening 25 of the inlet 23.

For purposes of demonstrating the function of the several parts, the diagrammatical view of Figure 13 is shown. The view of Figure 13 is obtained by opening up the wind box along a longitudinal seam and looking at it as one would look at the wind box from the center of the cupola. The position of the six tuyères is illustrated in Figure 13 and the relative position of the set of six vanes at a higher level and the seventh vane 39 still above is diagrammatically shown in this view. The air blast enters through the inlet conduit 23 into the wind box 22 in the upper portion thereof. The spacing and size of the parts in Figure 13 are not necessarily proportioned as the showing is merely diagrammatical for purposes of aiding in the clarity of the description. As is readily discernible from the several views of the drawings, the air blast in the absence of any deflection thereof may take several routes in reaching the several tuyères. In reaching some tuyères, the air need travel only a short distance, and in other tuyères it must travel a farther distance. Also in some instances, the shortest of routes is in one direction and in other cases, the shortest route may be in another direction. Therefore, different portions of the air blast will travel different routes even if it were assumed that the most direct routes would be taken.

In the usual wind box heretofore in standard practice and without my vanes, the deflecting action of the interior arcuate wall of the wind box and the meeting of one current by another are among the several factors which prevent any simple direct flow from the inlet to the several tuyères, and thereby adding to the complexity of the many currents and cross-currents of air travelling through the wind box. Also, the air blast travelling at a rapid rate around the wind box tends to collide with the air blast later entering the wind box from the inlet. There are several factors which produce a complex flow of currents, cross-currents, and counter-currents. As an example of the several factors which may influence the flow of the current of the air blast and the relative velocities of the same, it has been found by experimenting with smoke or other visible gases introduced into the usual wind box and without the vanes, that the smoke upon entering the wind box will rapidly circle around the wind box, collide with the smoke later entering the wind box, be deflected down to the bottom of the wind box by the collision, and immediately "bound" upwardly again, so that as a result, the air blast entering the tuyère immediately below the inlet may have a lower velocity than the velocity of the air blast entering some of the more distant tuyères. It is by reason of the several factors which cause inequalities among the several currents of the air blast and changes in velocity from one location in the wind box to another location, that it is necessary to control the movement of the several currents and cross-currents.

In my device the positioning of the several vanes in proper relationship permits the air blast to be so controlled and the relative velocities of the portions of the air blast so determined that each tuyère may be furnished with an air blast of a velocity substantially equal to the velocity of the air blast to every other tuyère. By the use of an anemometer, the velocities of the air blast entering each tuyère may be measured. Upon finding inequalities in the several velocities, the vanes will be revolved into their proper position and secured in this position in order that the velocity of each tuyère is substantially equalized.

The upper vane 39 gives an initial control to the air blast and deflects it into the desired course. As the air blast in its course moves toward the several tuyères, then each of the six vanes is influential in so deflecting and guiding the course of portions of the air blast that portions of the air blast supplied to each tuyère is thereby modified in velocity. The vanes meet and deflect the respective currents, cross-currents, and counter-currents and thereby modify the velocity of portions of the air blast. By proper operation of the vanes, the velocity at any one tuyère may be modified relative to the velocity of the air blast at other tuyères.

After testing with the anemometer, the proper position of the vanes may be determined and the vanes then secured in position. In Figure 10, there is illustrated, the mounting of the vane 54 within the wind box 22 in a manner so that the vane after being adjusted in position is locked in that position by merely tightening a nut upon the threaded end of the rod upon which the vane 54 is mounted. In this form there is no indication on the outside of the wind box as to the position of the vane and the vane is in a relative, permanent position after its proper angle of deflection has been found. Under uniform operating conditions, the vanes may be thus fixed in relatively permanent position in the manner shown. However, changes in the velocity of the total air blast from the inlet may so effect the relationship of the several currents, cross-currents, and counter-currents, of portions of the air blast within the wind box that the proper ratio of the velocities at each tuyère may be unbalanced. In such even, to again obtain the proper equalization of the several velocities it may be necessary to again adjust the position of the vanes. Therefore, to care for such a condition it is preferable to have adjustable vanes and means for adjustably securing them in position.

It is to be understood that the number and arrangement of the deflecting vanes or plates may be varied and other changes may be made, all within the scope of my invention. For example, the vanes or plates may be staggered or otherwise placed within the wind box. Also any obstruction which tends to deflect a portion of the air blast is to be considered the same as a vane or plate. The "tilting" of the vanes as referred to in the description and claims is to be understood as including any positioning of the vanes for obtaining the desired reflection, whether the vane is positioned horizontally, vertically, or in intermediate degrees.

In Figures 11 and 12, there is shown a somewhat modified form of mounting the vane 54 within the wind box 22. A supporting rod 56 is secured to the inner wall of the wind box 22 by the welding 57 and the lower free end of the rod 56 has a hole which acts as a bearing support. The vane 54 is rigidly secured to the rod 59 which has its inner end supported by the bearing provided in the rod 56. The outer end of the rod 59 extends through an opening and suitable washer element in the wall of the wind box 22. The indicating bar 58 is rigidly secured to the outer end of the rod 59 so that swinging of the bar 58 will rotate the rod 59 and the vane 54 secured thereto. The arcuate shaped dial plate 60 is secured to the outer surface of the wind box 22 by the weldings 62. An arcuate slot 63 is provided in the dial plate 60 and the screw bolt 61 extends through the slot 63 and through the indicating bar 58. There is a suitable head upon the screw bolt 61 and the combination of the screw bolt 61 with the dial plate 60 is such that by threadably turning the screw bolt 61 in one direction, the bar 58 will be rigidly secured to the plate 60 and upon loosening of the screw bolt 61, the bar 58 may be swung in an arc. In this manner, the vane 54 may be revolved into proper position and there secured against further movement by tightening the bolt 61.

In the foregoing description and exposition, theories have been advanced concerning combustion, melting, influence of velocities, factors determining velocities, and the deflecting action of the vanes, but it is to be understood that I am not to be bound by any theory thus advanced, it being sufficient that a new and operable apparatus and method is herein invented and disclosed giving a result not heretofore known and constituting an improvement in the art of great benefit.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. In a furnace having a wind box disposed adjacent the body of the furnace, said wind box having an inlet adapted to communicate with a source of blown air and having a plurality of tuyères having entrances into the wind box, the tuyères being adapted to communicate with the interior of the body of said furnace, the interior of the wind box forming a common chamber through which the blown air passes from the inlet to the entrances of the said tuyères, a plurality of deflecting vanes mounted at a distance from said entrances and within the common chamber of said wind box in the path of the blown air passing from said inlet to the entrances of said plurality of tuyères, adjustable means for tilting said vanes into deflecting position, and means for securing the said vanes in said deflecting position, the deflecting position of said vanes being such that the blown air in said wind box and meeting said vanes is divided and deflected in passing from said inlet to said plurality of tuyères to substantially equalize the velocity of the blown air delivered to the entrance of each of said tuyères.

2. In a furnace having a wind box forming a common distributing chamber for supplying blown air to the entrances of a plurality of tuyères entering said furnace, said wind box having an inlet positioned at a level above said tuyères, said inlet being adapted to communicate with a source of blown air, a plurality of vanes mounted within said wind box, each said vane being positioned at a level above the entrance of one of said tuyères and being positioned below the level of said inlet, means for adjustably tilting said vanes into deflecting position, and means for holding said vanes in deflecting position, the deflecting position of said vanes being such that the flow of the blown air passing through the wind box from said inlet to the entrances of said plurality of tuyères is modified to supply blown air at substantially equal velocities to the entrances of each of said tuyères.

3. In a cupola furnace having a plurality of tuyères for delivering an air blast to the interior of the furnace, a wind box mounted adjacent to the body of said furnace, said wind box having an inlet adapted to communicate with a source of air blast and having outlets opening into each of said tuyères, deflecting members positioned within said wind box at a distance from said outlets, and supporting means for supporting said deflecting members, said deflecting members being tilted for deflection of the air blast meeting said deflecting members as the air blast passes through said wind box to cause said air blast to be delivered to said outlets at substantially equal velocities.

4. In a wind box for a metallurgical furnace in which an air blast is blown through the wind box from an inlet to the entrances of a plurality of tuyères entering the body of said furnace, a plurality of plates carried by said wind box at a distance from said entrances to permit free flow through the entrances, operating means for moving each of said plates into deflecting position to modify the course of the air blast blowing through the wind box and meeting each plate, adjustable means for securing each of said plates in desired deflecting position, and indicating means on the outside of the wind box for indicating the deflecting position of each of the said plates within the wind box, each of said plates being adapted to be moved into a deflecting position in said wind box relative to the deflecting position of the other plates to cooperate therewith in diverting portions of said air blast in its course from said inlet to the entrances of said tuyères, the diversion of the air blast by said plates being such that the relative velocity of the air blast entering the entrances of each of said tuyères is controlled.

5. In a furnace having a wind box for supplying a blast of air to a plurality of tuyères, said wind box having an inlet adapted to communicate with a source of an air blast and having outlets in communication with said tuyères, deflecting members positioned within said wind box for deflecting portions of said air blast passing through the wind box from the inlet to said outlets, said deflecting members being positioned at a distance from said outlets to avoid constriction of said air blast entering said outlets, supporting means for supporting said deflecting members, and adjustable means for adjusting the position of said deflecting members to modify the velocity of said portions of said air blast.

6. In a wind box for furnishing a blast of blown air from a common source to a plurality of tuyères in which the tuyères are substantially uniform in size and distribution to afford uniform volume delivery of blown air through the tuyères, a plurality of deflecting vanes carried by, and positioned in, the wind box in the path of the blast of air passing from said common source to said tuyères for modifying the course of the air blast from the common source to the plurality of tuyères, means for adjusting the deflection of each of said vanes relative to the deflection of the other vanes, said vanes cooperating in modifying the course of the air blast to govern the velocity of the air blast entering each of said tuyères relative to the velocity of the air blast entering every other tuyère.

HERBERT A. REECE.